(12) United States Patent
Adell et al.

(10) Patent No.: US 11,082,822 B2
(45) Date of Patent: Aug. 3, 2021

(54) METHOD FOR ENABLING, AND CAUSING, STORED SETTINGS OF CONTROLS FOR FUNCTIONS OF A RADIO HEAD UNIT IN AN AUTOMOTIVE VEHICLE TO BE RE-PROGRAMMED

(71) Applicants: Loren S. Adell, Sunnyvale, TX (US); Michael Adell, Sunnyvale, TX (US)

(72) Inventors: Loren S. Adell, Sunnyvale, TX (US); Michael Adell, Sunnyvale, TX (US)

(73) Assignee: TRIGROUP TECHNOLOGIES, LTD., Frisco, TX (US)

( * ) Notice: Subject to any disclaimer, the term of this patent is extended or adjusted under 35 U.S.C. 154(b) by 0 days.

(21) Appl. No.: 16/854,275

(22) Filed: Apr. 21, 2020

(65) Prior Publication Data

US 2020/0252771 A1 Aug. 6, 2020

Related U.S. Application Data

(62) Division of application No. 16/273,088, filed on Feb. 11, 2019, now Pat. No. 10,652,715.

(60) Provisional application No. 62/629,599, filed on Feb. 12, 2018.

(51) Int. Cl.
*H04W 4/50* (2018.01)
*H04M 1/60* (2006.01)
*H04W 4/48* (2018.01)

(52) U.S. Cl.
CPC .......... *H04W 4/50* (2018.02); *H04M 1/6091* (2013.01); *H04W 4/48* (2018.02)

(58) Field of Classification Search
CPC ........ H04W 4/50; H04W 4/48; H04M 1/6091
See application file for complete search history.

(56) References Cited

U.S. PATENT DOCUMENTS

| | | | | |
|---|---|---|---|---|
| 10,652,715 B1* | 5/2020 | Adell | ...................... | H04W 4/48 |
| 2010/0063670 A1* | 3/2010 | Brzezinski | ......... | H04N 21/4126 |
| | | | | 701/31.4 |
| 2011/0275358 A1* | 11/2011 | Faenger | ................... | H04W 8/24 |
| | | | | 455/420 |
| 2013/0066518 A1* | 3/2013 | Chen | ...................... | G08C 17/02 |
| | | | | 701/36 |
| 2014/0277843 A1* | 9/2014 | Langlois | ............ | G01C 21/3661 |
| | | | | 701/2 |
| 2014/0277937 A1* | 9/2014 | Scholz | .................... | H04W 4/50 |
| | | | | 701/36 |
| 2015/0117667 A1* | 4/2015 | Lawande | ............... | B60K 35/00 |
| | | | | 381/86 |
| 2015/0127215 A1* | 5/2015 | Chatterjee | ............. | B60R 16/037 |
| | | | | 701/36 |
| 2016/0124882 A1* | 5/2016 | Suetsugu | .............. | G06F 9/4413 |
| | | | | 710/14 |
| 2016/0165031 A1* | 6/2016 | Gopinath | ............ | H04M 1/6091 |
| | | | | 455/569.2 |
| 2017/0101069 A1* | 4/2017 | Byrne | ................... | H04L 67/125 |
| 2019/0089807 A1* | 3/2019 | Ahmed | ................... | H04L 67/22 |

* cited by examiner

*Primary Examiner* — Brandon J Miller
(74) *Attorney, Agent, or Firm* — George L. Boller

(57) ABSTRACT

A method for re-programming a radio head unit in an automotive vehicle by a special "app" in a personal cellular (wireless) telephone.

5 Claims, 8 Drawing Sheets

METHOD FOR ENABLING, AND CAUSING, STORED SETTINGS OF CONTROLS FOR FUNCTIONS OF A RADIO HEAD UNIT IN AN AUTOMOTIVE VEHICLE TO BE RE-PROGRAMMED

This non-provisional patent application claims priority of allowed non-provisional patent application Ser. No. 16/273,088, filed Feb. 11, 2019, which has priority to Provisional Patent Application No. 62/629,599, filed Feb. 12, 2018, the present application incorporating by reference the entire content of each of those prior applications.

TECHNICAL FIELD

This invention relates to an automotive vehicle which has a radio head unit which has multiple functional capabilities, one of which allows the vehicle to wirelessly communicate via a cellular network with a remote party.

BACKGROUND

The interior of a typical automotive vehicle has an instrument panel which faces a driver of the vehicle and a front seat passenger. A head unit, sometimes referred to as a radio head or radio head unit, is typically disposed centrally in the instrument panel for viewing, and access, by both a driver and a passenger. A radio head unit provides various functional capabilities.

A typical radio head unit comprises an electronic display screen and various inputs such as control switches for controlling various functions of the radio head unit and other devices and/or functions which are fully or partially controlled by or through the radio head unit. Additional control switches may be present in the instrument panel outside the radio head unit and electrically connected with the radio head unit for controlling certain functions within the radio head unit and/or functions which are remote from, but controlled, through the radio head unit.

The vehicle has a radio antenna for sending and receiving radio transmissions. The radio antenna is connected to a radio receiver in the radio head unit. The radio receiver comprises circuitry for converting received radio transmissions into audio signals. Amplification circuitry amplifies the audio signals which are then input to an audio system having speakers which convert the amplified audio signals into audio content which can be heard by vehicle occupants.

Control switches, whether in the radio head unit or elsewhere in a vehicle, such as on a steering wheel, can select audio signals from in-vehicle sources, such as CD and DVD players for example, to be input to the amplification circuitry and consequently be heard by vehicle occupants instead of broadcast radio. Such other sources may be built into the radio head unit or may be self-contained auxiliary devices which plug into or have wireless communication with the radio head unit.

The control switches perform various functions such as selecting the audio source, setting audio quality and volume, selecting specific content from a selected source, selecting a particular broadcast radio band, and selecting a particular radio station within a band.

The antenna may be designed with capability for receiving not only radio signals in AM, FM and other broadcast radio bands, such as satellite radio. The antenna may also be designed to receive signals from satellites of the Global Positioning System (GPS) for use in navigation.

SUMMARY THE DISCLOSURE

Disclosed are a system and method for restoring local control to at least portions of a radio head unit in a motor vehicle when communication between a personal cellular (wireless) telephone, which has been paired with the radio head unit, and a telephone of a remote party is placed "on-hold" while both telephones are "off-hook".

Also disclosed, and claimed herein, is a method for re-programming the radio head unit by a special "app" in a personal cellular (wireless) telephone which offers greater convenience for a person because it allows a person to enter re-programming data in the telephone without necessarily having to be inside the vehicle and enter data via controls and/or devices associated with the radio head unit inside the vehicle.

The foregoing summary, accompanied by further detail of the disclosure, will be presented in the Detailed Description below with reference to the following drawings that are part of this disclosure.

DETAILED DESCRIPTION

Figure 1:
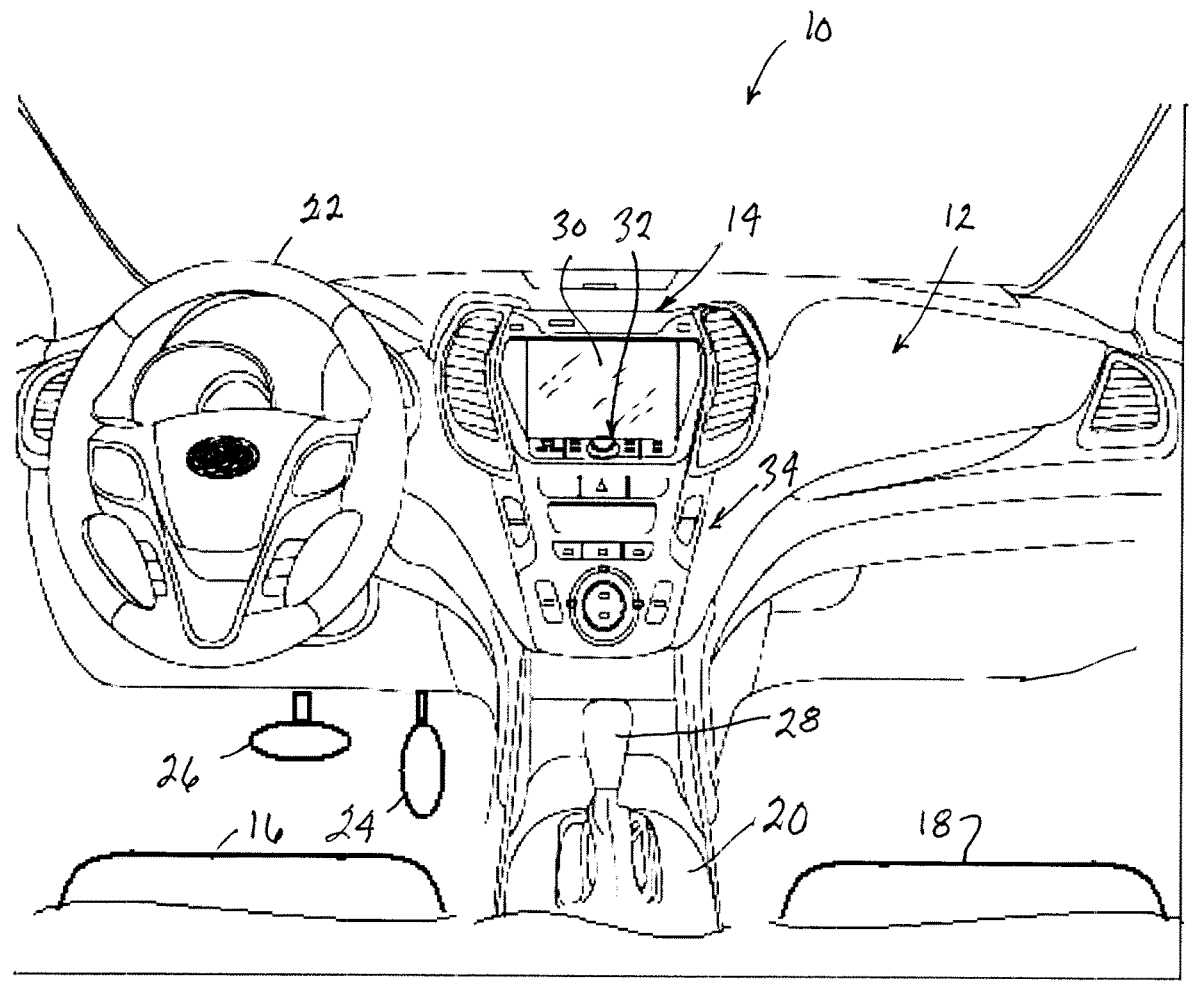
FIG. 1 is a front view of an instrument panel in the vehicle which contains a radio head unit and which faces rearward toward a driver's seat on the left and a passenger's seat on the right.

FIG. 1 shows a portion of an interior of an automotive vehicle 10 having an instrument panel 12 which contains a radio head unit 14 and which faces rearward of the vehicle toward a driver's seat 16 on the left and a passenger's seat 18 on the right. Driver's seat 16 and passenger's seat 18 are separated from each other by a console 20.

A person seated in driver's seat 16 controls how vehicle 10 is being driven, using controls which include a steering wheel 22, a foot operated accelerator pedal 24, a foot operated brake pedal 26, and a transmission control lever 28 in console 20.

Radio head unit 14 is disposed centrally of instrument panel 12 for viewing and access by both a driver and a passenger. Radio head unit 14 comprises an electronic display screen 30 and various control switches, 32 generally, for controlling various functions of radio head unit 14, and other devices and/or functions which are fully or partially controlled by or through radio head unit 14. Such switches may be mechanical ones or touch-screen switches present in display screen 30. Additional control switches, 34 generally, are shown in instrument panel 12 below radio head unit 14 and they may or may not be associated with radio head unit 14. One example of a function which is provided via radio head unit 14 is vehicle navigation and travel information both in audible form via audio speakers and in visual form via maps on display screen 30. Another function is display of a telephone directory on display screen 30

Figure 2:
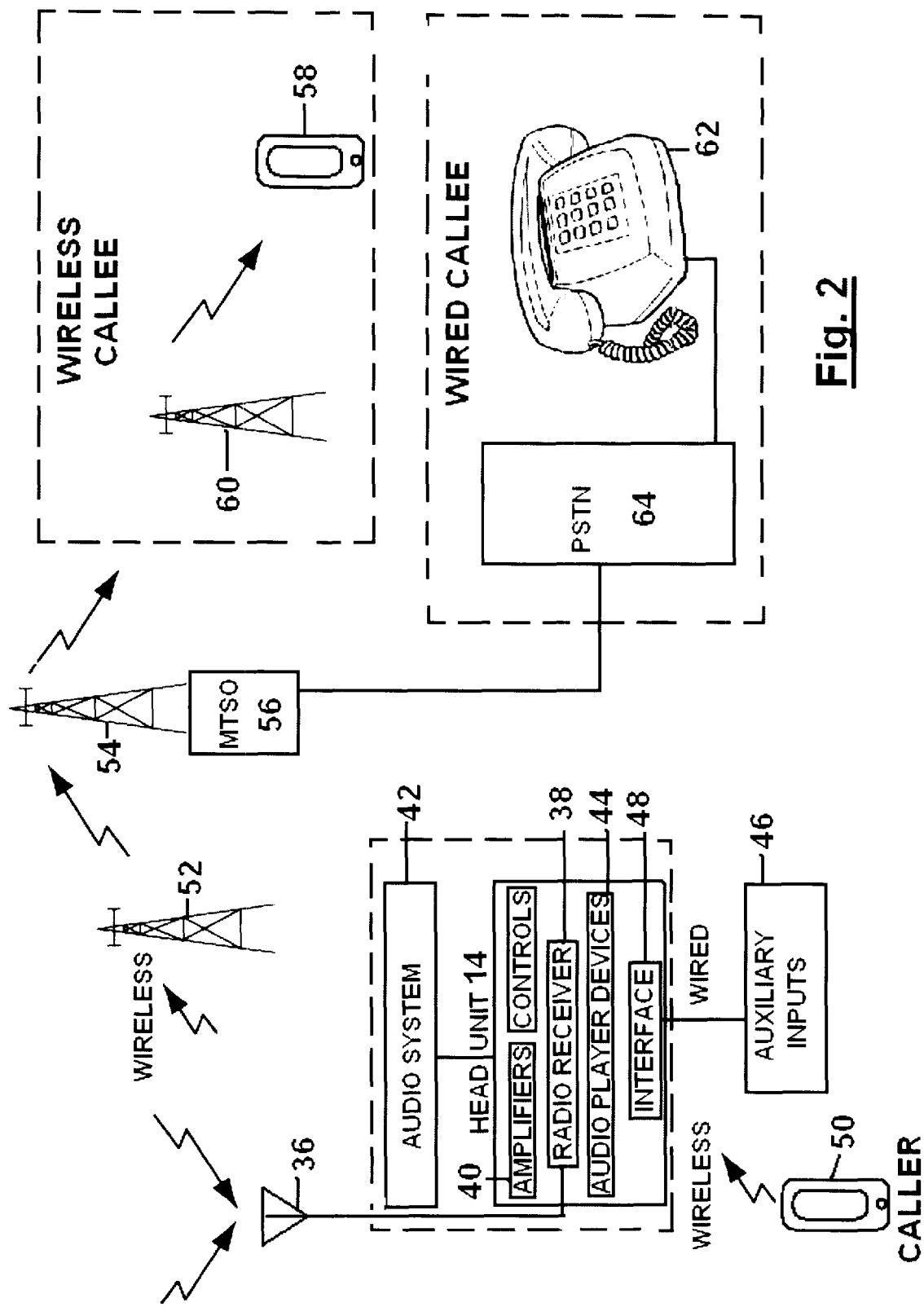
FIG. 2 is a diagram showing an automotive vehicle having a radio head unit with which a cellular telephone has been paired and how wireless telephonic communication between the cellular telephone and a telephone of a remote party takes place.

FIG. 2 shows that vehicle 10 has a radio antenna 36 for receiving broadcast radio transmissions. Antenna 36 is connected to a radio receiver 38 in radio head unit 14. Radio receiver 38 comprises circuitry for converting radio transmissions received by antenna 36 into audio signals. Radio transmissions can be any of various types, including without limitation amplitude modulation (AM) and frequency modulation (FM) which carry audio signals. The circuitry of radio receiver 38 which receives modulated radio signals that carry audio content comprises circuitry for de-modulating the received radio signals to extract audio content as audio signals. Radio head unit 14 also comprises controls for controlling certain functions of the radio head unit.

Amplification circuitry 40 in radio head unit 14 amplifies the audio signals which are then input to one or more speakers of an audio system 42. The speakers convert the amplified audio signals into audio which can be heard by vehicle occupants. Antenna 36 can also be designed to have the capability to receive data signals, such as signals from the Global Positioning System (GPS) for use by the vehicle's navigation system to display the vehicle's location in an electronic map on display screen 30. Antenna 36 may also be capable of receiving data signals from other sources. Data signals may provide various types of information to the vehicle and/or an occupant. Some types of data signals are intended to be converted into text or graphics for presentation on display screen 30. Other types of data signals are intended to be converted into audio which is presented via speakers of audio system 42.

Audio signals can be delivered from a selected source other than antenna 36 and receiver 38 to the amplification circuitry for delivery to the speakers and conversion into audio which can be heard by vehicle occupants. Such sources 44 may be built into radio head unit 14, or they may be self-contained auxiliary devices 46 which plug into an interface 48 in radio head unit 14 or which wirelessly communicate with the radio head unit.

FIG. 2 shows a personal cellular (wireless) telephone 50 which has been wirelessly paired with radio head unit 14 (e.g. Bluetooth). The pairing with radio head unit 14 enables a caller to place a call from the number assigned to the cellular telephone to a remote party by using certain controls for the radio head unit. Controls for the radio head unit also allow an incoming call to be answered.

In FIG. 2 an antenna which is internal to cellular telephone 50 is in wireless communication with an antenna on a cellular tower 52 which in turn is in communication an antenna on a cellular tower 54 which has, or is associated with, an MTOS (mobile telephone switching office) 56. When a caller places a call from telephone 50 to a remote party (the callee), status of telephone 50 changes from "on-hook" to "off-hook". Upon receiving the number being called, MTOS 56 first confirms that the number of the calling telephone is a valid subscriber to its telephone service. Upon confirmation, the call is routed to the telephone whose number is being called. That telephone may be either a wireless cellular telephone 58 which is in communication with a wireless network, represented by antenna tower 60, or a telephone 62 wired to a PSTN (public switch telephone network) 64 via what is commonly called a land line.

When a call from telephone 50 is connected to the telephone of the callee, the status of the callee's telephone may be either "on-hook" or "off-hook." When the callee's telephone is "on-hook," the callee can answer the call, and when the call is answered, the status of the callee's telephone changes to "off-hook". When a call from telephone 50 is connected to the callee and the status of the callee's telephone is "off-hook", the call will not be completed, and the caller is notified by a busy signal. However, if the callee is on a call and his/her telephone service has a "call-waiting" feature, the callee will be notified of the incoming call and given the option to answer it within a certain length of time. The caller does not receive a busy signal during that time.

If the call is answered, the caller and callee can then speak with each other. During the call, either party can use its telephone to change the status of the call from "not on-hold" to "on-hold". If the callee's telephone places the call "on hold", the status of the callee's telephone still remains "off-hook" and therefore does not cause the call to be disconnected. The status of the caller's telephone is of course "off-hook", but the caller's telephone is notified of the change in status of the call to "on-hold". Consequently, radio head unit 14 remains tied up with the call and continues not allowing a vehicle occupant to use at least some of the other capabilities which the radio head unit would otherwise provide, such as the vehicle navigation system mentioned earlier.

An additional capability which is lost while the status of the call is "on-hold" is the ability of the vehicle's audio system to play audio content that the caller might prefer to be hearing during the hold instead of having to listen to music or recorded messages which might be coming from the callee. The "on-hold" placed by the callee's telephone however doesn't prevent the vehicle's audio system from playing audio content of the caller's choosing during the hold.

Radio head unit 14 has certain settings which are selectable by a vehicle occupant. For example, an occupant may set a certain default audio source which will play automatically through the audio system when a remote party's telephone places a call "on-hold" and the "on-hold" is detected by radio head unit 14. One of the controls associated with radio head unit 14 allows an occupant to switch to a source other than the default source if desired, and that is an example of a capability of the radio head unit which is not lost when the call has been placed "on hold". Adjustment of audio speaker volume is another capability which is not lost when a call is placed "on-hold".

Default settings may have a hierarchy. At one level of one example of a hierarchy, an occupant may set a default broadcast radio band or a default auxiliary device. At the next level, an occupant may set a default radio broadcast station within the default broadcast radio band or a default audio file within the default auxiliary device. While a call is "on-hold", controls allow an occupant to change from the default broadcast radio band setting to another broadcast radio band, and in any broadcast radio band, allow an occupant to change from one station to another.

A current default setting within a hierarchy is changed to a new default setting by an occupant using a re-programming feature present in radio head unit 14. Re-programming requires an occupant to be present in the vehicle.

Rather than being inside a vehicle and using controls of the radio head unit to re-program features, a person can perform re-programming in a different way which can offer greater convenience because the person does not have to be inside the vehicle and use controls of radio head unit 14 to perform re-programming. Instead, a person can re-program data on a cellular (wireless) telephone at any place, such as at home or office, and at any time which are more convenient for the person.

This new way is accomplished by a re-programming application (i.e. an "app") in a person's portable cellular (wireless) telephone. The app is specifically designed for compatibility with vehicles which are manufactured by a particular manufacturer. The "app" enables a person to re-program data, such as data for default settings in radio head unit 14, without entering the data via re-programming controls of the radio head unit.

Figure 3:
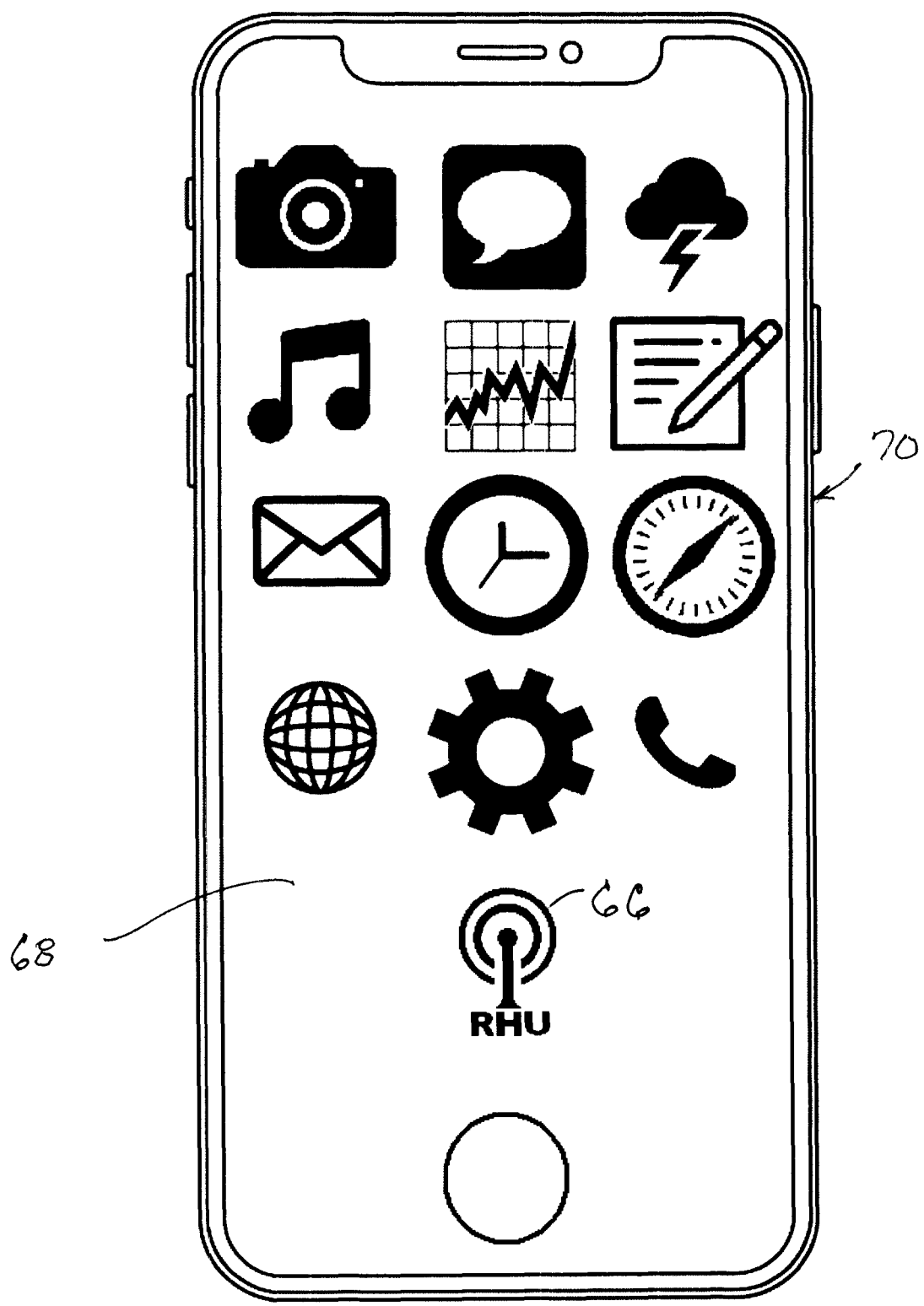
FIG. 3 is a front view of a cellular telephone showing a first screen on a touch screen of the telephone.

FIG. 3 shows an icon 66 for the re-programming "app" on a touch screen 68 of a cellular (wireless) telephone 70. When touch screen 68 is touched at the location of icon 66, the re-programming "app" opens and displays a screen, or a succession of different screens, via which changes, such as changes to default settings, can be made and stored in the telephone by touching icons of screens displayed on touch screen 68. The stored data is then ready to be applied to the radio head unit. Re-programming screens may contain icons and/or alpha-numeric keyboards whose keys can be touched.

Figure 4:
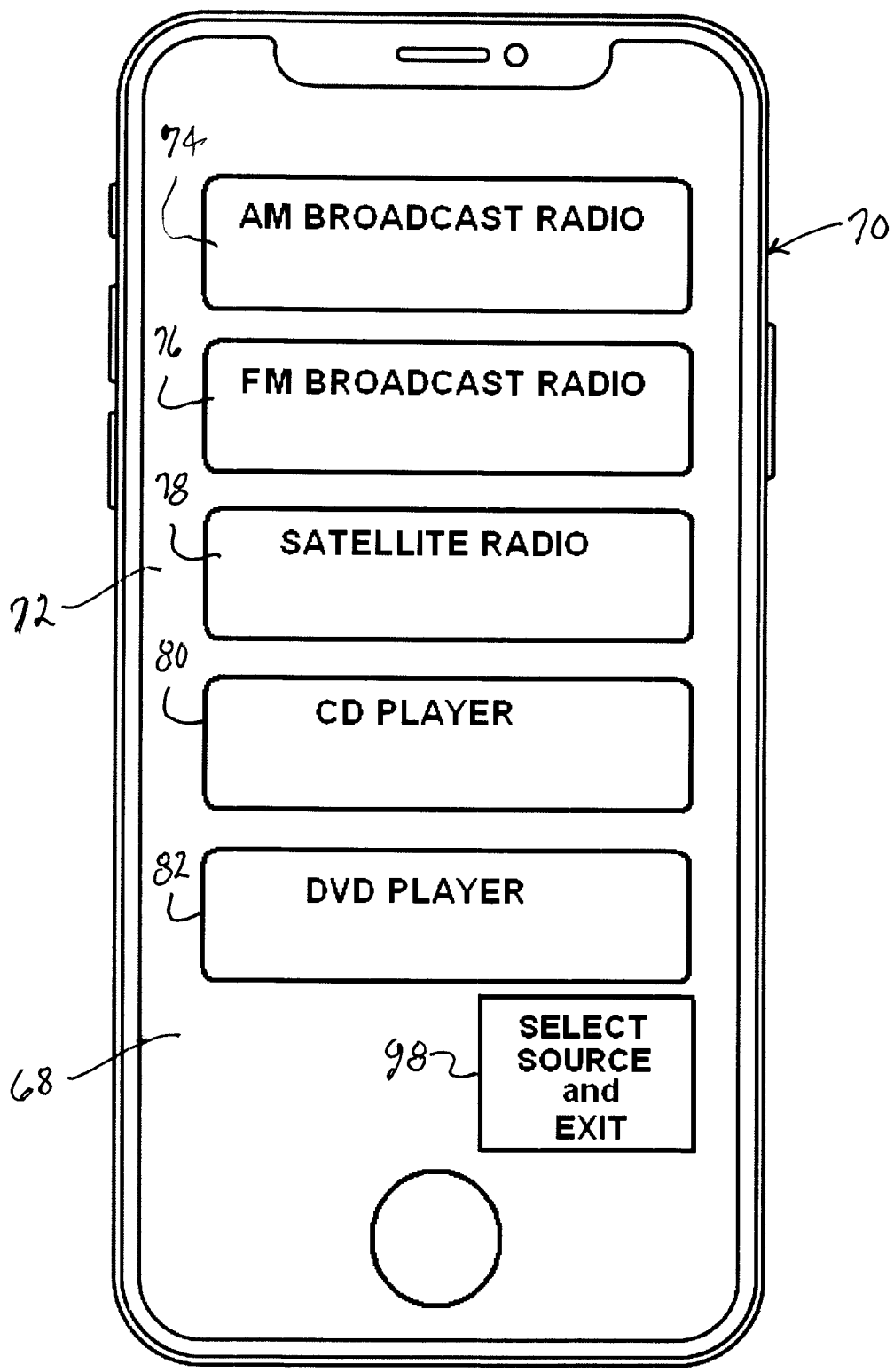
FIG. 4 is a view like FIG. 3 but showing a second screen on the touch screen.

FIG. 4 is an example of a screen 72 which appears on touch screen 68 after icon 66 has been touched. An icon 74, when touched, allows AM broadcast radio settings to be changed. An icon 76, when touched, allows FM broadcast radio settings to be changed. An icon 78, when touched, allows satellite radio broadcast settings to be changed. An icon 80, when touched, allows settings of a CD player to be changed. An icon 82, when touched, allows settings of a DVD player to be changed.

Figure 5:
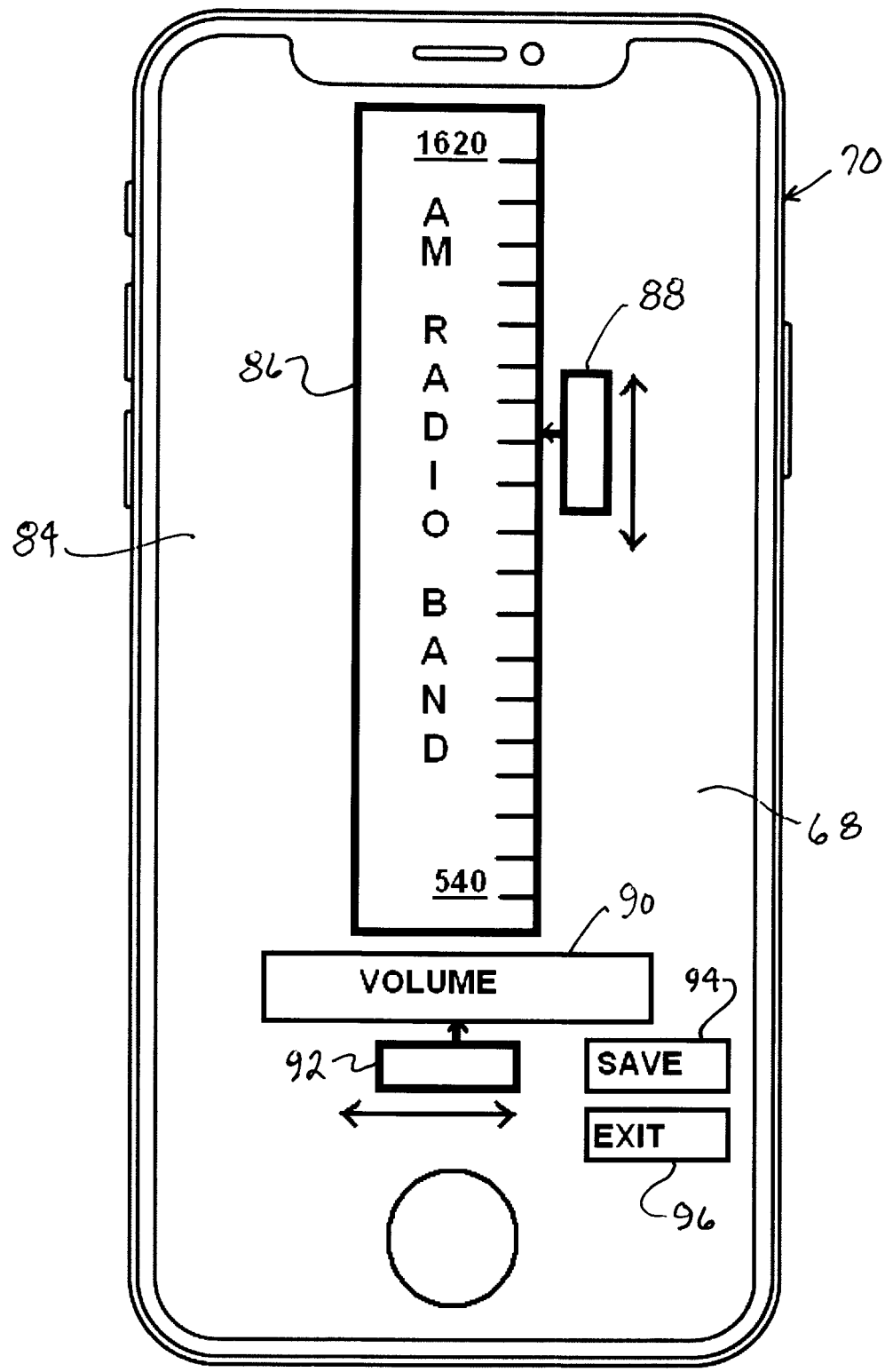
FIG. 5 is a view like FIG. 3 but showing a third screen on the touch screen.

FIG. 5 shows a screen 84 which appears on touch screen 68 after icon 74 has been touched. Screen 84 shows an image of an AM radio band 86. A station selector 88 is positionable by touch along band 86 to select a default AM radio station.

FIG. 5 also shows an image of a volume control 90 for controlling volume of AM radio audio played on the vehicle's audio system. A volume selector 92 is positionable by touch along volume control 90 to select a default volume.

Once the default station and volume have been selected, a "save" icon 94 is touched to save the selections after which an "exit" icon 96 is touched to return to screen 72. Default settings for the other icons 76, 78, 80, and 82 can then be set in a similar matter. Once all default settings have been selected and saved for all five possible audio sources shown in FIG. 4, an icon 98 is touched to select one audio source from the five possible ones shown as the default audio source and then return to screen 68. The re-programmed settings are then ready to be installed in radio head unit 14 when the person enters the vehicle and powers up the radio head unit.

Figure 6:
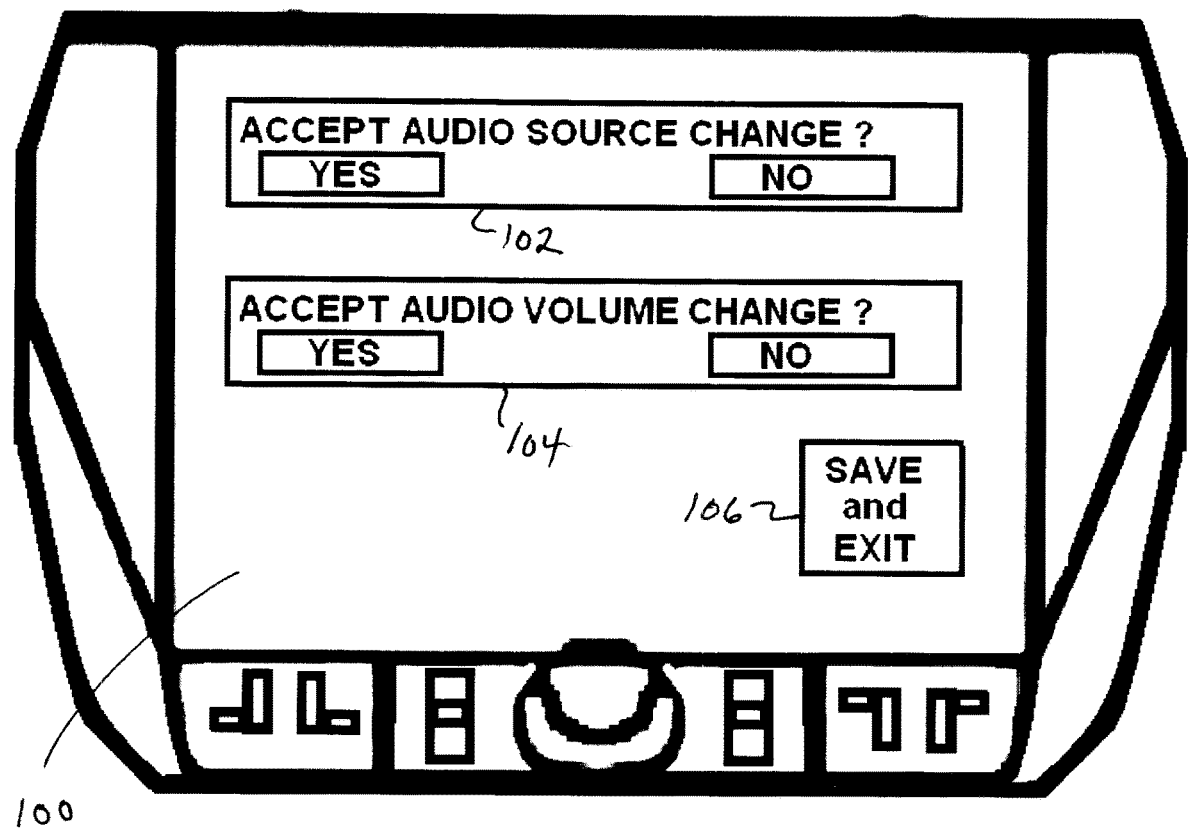
FIG. 6 is a front view of the radio head unit showing a first screen on a touch screen of the radio head unit.

Because of the pairing of the cellular (wireless) telephone and the radio head unit, a screen 100 (FIG. 6) containing two icons 102, 104 first appears on the touch screen of the radio head unit at power up when the radio head unit detects a mismatch between its stored settings and the corresponding re-programmed settings in the telephone. Each of two icons 102, 104 seeks an answer to a question asking if the re-programmed settings should be accepted by the radio head unit. This affords the person an opportunity to reconsider if each change should be made. If they are accepted by touching the "yes" icons, the radio head unit installs the re-programmed settings so that the re-programmed settings in the radio head unit match those in the telephone. If one or both re-programmed settings is or are not accepted, the previous settings are maintained in both the radio head unit and the telephone. Touching a "save and exit" icon 106 returns the screen to a home screen shown in FIG. 7.

Figure 7:
FIG. 7 is a view like FIG. 6 but showing a second screen on the touch screen of the radio head unit.
Figure 8:
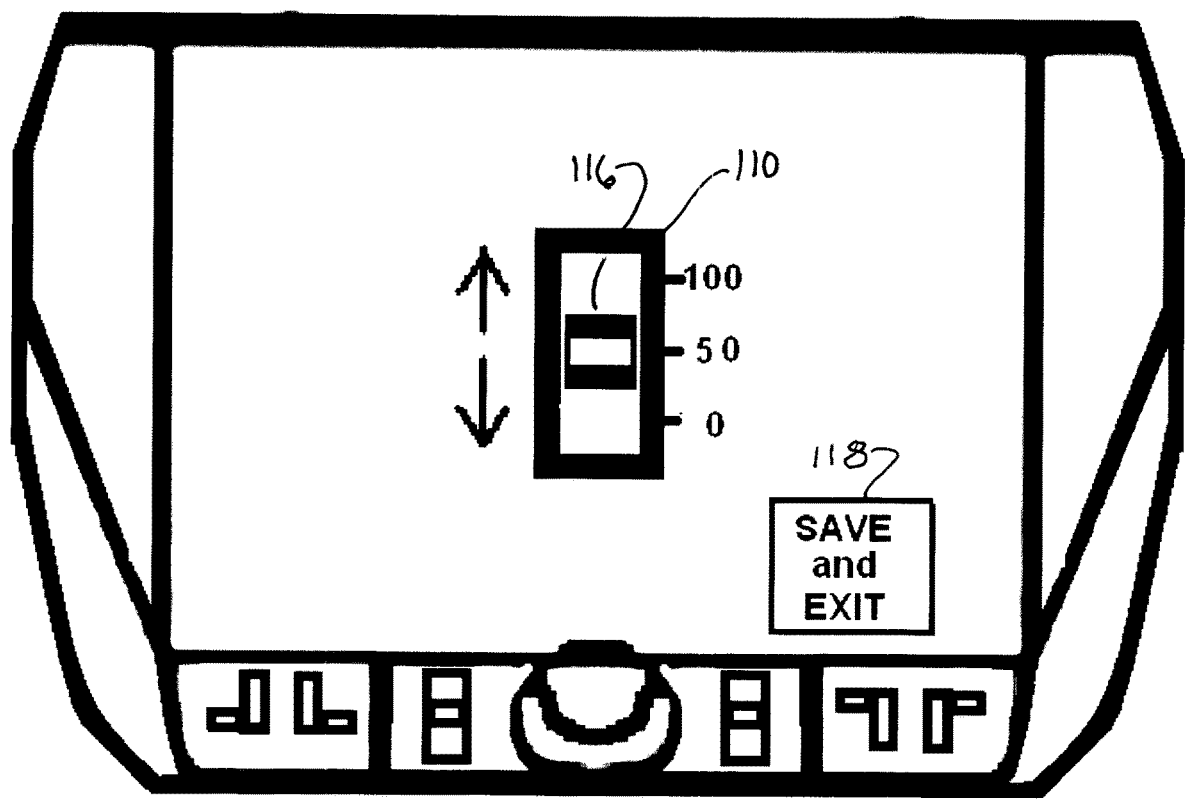
FIG. 8 is a view like FIG. 6 but showing a third screen on the touch screen of the radio head unit.

The screen of FIG. 7 may contain one or more icons such as 108, 110, 112, and 114 for re-programming the radio head unit via its touch screen rather than using manual controls outside the touch screen. When one of those icons, such as 110, is touched, a screen like that shown in FIG. 8 appears on the touch screen. A setting is changed by a slider 116 similar to sliders 88 and 92 and then saved by touching an icon 118 which returns the screen display to the one shown in FIG. 7.

It is also possible for changes to be made without a person actually entering the vehicle and powering up the vehicle's electronic systems including the radio head unit if the radio head unit and some of the electronic system associated with the radio head unit remains powered up, such as by a back-up battery, while the electrical system is off. It is also possible for the cellular telephone to wirelessly power up the radio head unit and associated electronics.

If a vehicle can provide different settings of certain devices for different drivers, such as a default seat adjustment position and a default mirror adjustment position for each driver, using a driver selection switch, the radio head unit may store default preferences for each individual driver, and that selection switch may be used to also set the audio defaults for the individual who is driving when a call is placed on hold.

When a call from cellular telephone 50 has been answered, the conversation between caller and callee can be heard over the vehicle's speakers. The caller may however choose to instead carry on the conversation through the cellular telephone's speaker and microphone by pressing a button on the cellular telephone. Doing that prevents the conversation from being heard over the vehicle's speakers.

If there is a different wireless communication device (a Bluetooth ear piece having a microphone and speaker for example) which has also been paired with radio head unit 14 and that device is within range of radio head unit 14, it can be used to place a call from the cellular telephone to a remote party via voice commands to radio head unit 14.

What is claimed is:

1. In an automotive vehicle which has a radio head unit having 1) a radio receiver for receiving wireless signals that carry audio content, 2) circuitry for extracting audio content from the wireless signals and for delivering extracted audio content to an audio system for transmission as audio into an occupant space of a motor vehicle, and 3) controls having stored settings for functions of the radio head unit, a method for enabling stored settings of controls for functions of the radio head unit to be re-programmed, the method comprising:

in a cellular telephone, starting a re-programming app which is operable to present one or more display screens on a touch-screen of the cellular telephone for enabling the cellular telephone to re-program settings of controls for functions of the radio head unit;

when a display screen is presented on the touch-screen, selecting a setting of a control for a selected function presented on the display screen for re-programming the setting of that control via the touch-screen, after which the re-programming app is operable to cause a new display screen to be presented on the touch-screen for performing re-programming of the setting of that control via the touch-screen, then, while the new display screen is being presented on the touch-screen, using the touch-screen to perform re-programming of that setting, and then using the touch-screen to save the re-programmed setting in the cellular telephone.

2. The method set forth in claim 1 further comprising, pairing the cellular telephone with the radio head unit to enable wireless communication, when the radio head unit detects that a re-programmed setting saved in the cellular telephone differs from the corresponding setting installed in the radio head unit, the radio head unit is operable to replace the corresponding setting installed in the radio head unit with the re-programmed setting by a step of accepting the re-programmed setting.

3. The method set forth in claim 2 in which the step of accepting the replacement setting is performed via a touch-screen in an automotive vehicle which contains the radio head unit.

4. The method set forth in claim 1 in which the radio head unit can receive wireless radio signals from multiple radio frequency bands, and the method further comprises, the re-programming app operating to present a display screen on the touch-screen showing multiple radio frequency bands from which the touch-screen can select one radio frequency band which, after being selected, the app operates to present the selection as a display screen showing saved settings of the selected radio frequency band on the touch-screen.

5. The method set forth in claim 4 in which, the re-programming app operates to present, on the display screen which shows the multiple radio frequency bands, additional in-vehicle audio sources which can be selected by the touch-screen.

\* \* \* \* \*